US006919048B2

(12) United States Patent
Hoffmann et al.

(10) Patent No.: US 6,919,048 B2
(45) Date of Patent: Jul. 19, 2005

(54) THIN MULTI-STAGE CATALYTIC REACTOR WITH INTERNAL HEAT EXCHANGER, AND USE THEREOF

(75) Inventors: Frédéric Hoffmann, Sainte Foy les Lyon (FR); Eric Lenglet, Rueil Malmaison (FR); Philippe Mege, Reventin Vaugris (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 117 days.

(21) Appl. No.: 10/084,493

(22) Filed: Feb. 28, 2002

(65) Prior Publication Data

US 2002/0159933 A1 Oct. 31, 2002

(30) Foreign Application Priority Data

Feb. 28, 2001 (FR) .............................. 01 02841

(51) Int. Cl.[7] .............. B01J 8/00; B01J 8/08; B01J 8/12
(52) U.S. Cl. .............. 422/146; 422/139; 422/141; 422/142; 422/145; 422/146; 422/188; 422/232; 422/236
(58) Field of Search .............. 422/139, 141, 422/142, 145, 188, 193, 194, 195, 196, 197, 198, 232, 236, 238, 239

(56) References Cited

U.S. PATENT DOCUMENTS 3,799,866 A * 3/1974 Lengemann ............... 208/139
4,040,794 A * 8/1977 Stone ........................ 422/190
4,423,022 A * 12/1983 Albano et al. .............. 423/360
5,623,989 A * 4/1997 Kroger ....................... 165/152
5,656,243 A * 8/1997 Luckenbach et al. ....... 585/484

FOREIGN PATENT DOCUMENTS

FR   1 175 454   3/1959
FR   2 129 913   11/1972

* cited by examiner

Primary Examiner—Alexa Doroshenk
(74) Attorney, Agent, or Firm—Millen, White, Zelano, Branigan, P.C.

(57) ABSTRACT

An elongate reaction vessel and process includes at least two stages in the vertical direction in which an endothermic or exothermic catalytic reaction is carried out and comprises: a catalytic reaction zone (12a, 12b) per stage (6, 7); introducing (2) a reaction fluid to a stage adapted for transverse motion of the fluid across the whole vertical extent of the reaction zone; introducing and extracting the catalyst; a heat exchanger (5a) for reaction fluids located inside the vessel between two successive reaction zones; means (6) for transporting reaction fluids from one stage to another preferably connected to the exchanger of the stage under consideration and to the inlet for reaction fluids of the subsequent stage; and means for recovering reaction fluids downstream of the last stage. The temperature variation in each zone and the temperature level are respectively adjusted by the thickness of each zone and by heat exchange.

36 Claims, 7 Drawing Sheets

THIN MULTI-STAGE CATALYTIC REACTOR WITH INTERNAL HEAT EXCHANGER, AND USE THEREOF

The present invention relates to a reactor or reaction vessel inside which a catalytic reaction is carried out on at least one reactive fluid in the presence of a catalyst. It also relates to a process for converting hydrocarbons in this reactor and to its application to the dehydrogenation of linear paraffins.

The prior art is illustrated by the following United States and French patents: U.S. Pat. No. 4,040,794, U.S. Pat. No. 4,423,022, FR-A-2 129 913 and FR-A-1 175 454.

In many industries such as the petrochemical or chemical industries, treatment processes are employed that use reactors in which chemical reactions are carried out between at least one reactive fluid and a catalyst under certain temperature and pressure conditions. Depending on whether these chemical reactions produce heat or absorb it, they are respectively termed exothermic or endothermic.

When said chemical reaction (endothermic or exothermic) is balanced, a variation in temperature is known to displace the equilibrium of said reaction in one direction or the other.

While its field of application is extensive, the present invention is more particularly applicable to the case of an endothermic hydrocarbon dehydrogenation reaction. In particular, the present apparatus is particularly suited to carrying out a long chain paraffin dehydrogenation reaction, a step in the process for producing aromatic compounds wherein at least one of the substituents on the aromatic ring is a linear aliphatic chain, generally alkyl, normally containing 3 to 20 carbon atoms, and usually containing 10 to 14 atoms (linear alkyl benzene, LAB)).

In the remainder of the present description and while the present apparatus can be applied to the any type of endothermic or exothermic reaction, we shall use the example of said dehydrogenation of linear paraffins generally containing 3 to 20 atoms, preferably 10 to 14 carbon atoms, to obtain monounsaturated olefinic compounds.

Further, in the context of said dehydrogenation, a number of aspects have to be considered to determine the optimum conditions for producing monounsaturated olefins. The degree of conversion of the reactants is necessarily limited by the selectivity of the dehydrogenation reaction: reaction conditions producing high paraffin conversion cause the unwanted formation of polyunsaturated compounds such as di- or tri-olefins, generally considered by the skilled person to be precursors in the unwanted reactions leading to the irreversible formation of aromatic compounds, polyaromatic compounds and coke. These unwanted reactions are extremely deleterious in the context of synthesising LAB alkylation precursors and as a result must be minimised.

In particular, high temperatures displace the equilibrium of the endothermic reaction in the direction of the formation of unsaturated compounds and cause high degrees of conversion but lower selectivity for monounsaturated compounds. Further, too high a temperature causes a reduction in the service life of the catalyst and/or modifies the structural characteristics thereof (crystalline structure, grain size, for example).

To overcome these problems, two pathways can be considered, alone or in combination:
develop a catalyst with higher selectivity for mono-olefin formation;
employ operating conditions that produce high selectivity as regards mono-unsaturated compound formation while maintaining an acceptable conversion level, for example by controlling the temperature profile of the reaction fluids circulating in the reactor.

This control of the temperature profile of the reaction fluids in the reactor constitutes the subject matter of the present invention. The present apparatus provides a solution that is simple to execute and cheap, at least partially overcoming the problems elucidated above.

In the context of processes employing a catalytic reaction, the most frequently used technology is a fixed bed technology. The fixed bed is constituted by a compact, immobile stack of catalyst grains inside a generally immobile vessel. This technology, however, appears to be unsuitable to the present application as heat exchange must be carried out at the same time as the reaction. Heat exchangers are inserted inside the fixed catalytic bed, but this means that controlling the temperature profile of the fluids at any point in the catalytic bed is difficult, and there are problems with dimensions, bulk and compactness of the apparatus. In particular, the existence of hot spots causes the formation of undesirable products close to the heating surfaces, and hot spots are inevitable in that type of configuration. Controlling the selectivity of the reaction also appears to be difficult in such an arrangement. Finally, replacing the catalyst in a single fixed bed can mean that the unit has to be shut down. Thus, this technology is difficult to envisage for reactions such as dehydrogenation in which catalyst deactivation is relatively rapid.

A further technology employed for catalytic reactions proposes positioning a moving bed constituted by a stack of grains of catalyst in a vessel, said grains generally being displaced from top to bottom of the reactor under gravity.

That type of apparatus firstly facilitates regeneration of the catalyst and secondly, encourages replacement of the catalyst as the reactor functions.

Such a reactor for regenerative reforming has been described, for example, in U.S. Pat. No. 4,567,023.

However, as dehydrogenation reactions are very rapid and highly endothermic, means for heat exchange with reaction fluids resulting in a very large heat addition per unit volume must be envisaged when using a moving catalytic bed. A reactor operating in accordance with that principle must also be manufactured so as to allow effective control of the reaction temperature at every point of the catalytic bed or beds (primarily avoiding the presence of hot spots) to keep the yield high and good selectivity of the reaction as mentioned above.

One solution that has been proposed is to insert heating tubes inside the reaction bed to ensure heat transfer to the reaction fluids and to maintain the temperature, to provide an acceptable degree of conversion, for example as described in German patent application DE-A-3 318 098. However, that solution suffers from the disadvantage of generating temperature gradients in the bed between the tubes in which the heat carrying fluid moves and thus does not provide optimum temperature control.

It has now been discovered, and this forms part of the subject matter of the invention, that it is possible to substantially improve the yield and selectivity of an endothermic reaction by better control of the temperature of the reaction fluids in the reactor by separating the location of said reaction and the location of heat exchange between the heating means and said fluids. More precisely, in accordance with the invention, a multitude of reaction zones separated from each other by heat exchangers can continuously and efficiently control the temperature profile in the reaction vessel.

In one aspect, then, the invention provides a reaction vessel employed to carry out a chemical conversion process in catalytic beds with means for supplying or evacuating heat integrated into and separate from said catalytic beds in said vessel, with a very compact reaction zone; the invention also provides for optimum use of the catalyst.

The advantages of the reaction vessel of the present invention compared with known prior art apparatus are:

- a substantial improvement in conversion performances (selectivity, yield);
- greater reliability due to the simplicity and compactness of the means employed;
- greater safety due to the possibility of using heat carrying fluids that are chemically inert or the feed itself to encourage heat exchange with the reaction fluids;
- low manufacturing and functioning costs.

More precisely, the invention concerns a reaction vessel that is elongated substantially along a substantially vertical axis, comprising at least two stages in the vertical direction, in which at least one endothermic or exothermic catalytic reaction is carried out, comprising:

- means for introducing at least one reaction fluid to a stage;
- a reaction vessel that is elongated substantially along a substantially vertical axis comprising at least two stages in the vertical direction, in which at least one endothermic or exothermic catalytic reaction is carried out, and comprising:
    - at least one catalytic reaction zone (12a, 12b) per stage (6, 7) and extending substantially along the axis of the vessel;
    - means (2) for introducing at least one reaction fluid to a stage adapted for fluid movement in a substantially transverse direction over substantially the whole vertical extent of the reaction zone;
    - means for introducing catalyst into the reaction zone and means for extracting catalyst from the reaction zone;
    - at least one means (5a) for heat exchange with the reaction fluids, located inside the vessel between two successive reaction zones;
    - means (6) for transporting reaction fluids from one stage to another connected firstly to a heat exchange means and secondly to the reaction zone, and preferably connected to the heat exchange means of the stage under consideration and to means for introducing reaction fluids of the following stage;
    - means for recovering reaction fluids downstream of the last stage;
    - the thickness of each reaction zone being determined to limit the variation in temperature in said zone and the heat exchange means being adapted to adjust the temperature of the reaction fluids entering the reaction zone to a level substantially at most equal to that of the temperature of the reaction fluids entering the preceding zone.

The term "temperature substantially at most equal to" means:

- either a temperature at the inlet to a zone (i) substantially the same as that at the inlet to the preceding zone (i−1);
- or a temperature at the inlet to a zone (i) lower than that of the inlet to the preceding zone (i−1).

Usually, the vessel is substantially cylindrical and the reaction fluid or fluids move substantially radially all along the stages in said vessel.

Preferably, the catalytic reaction or reactions are endothermic and a heat carrying fluid the temperature of which is higher than the temperature of the reaction fluids moves in the heat exchange zone or zones.

In accordance with one characteristic of the vessel, the catalyst can be located in fixed beds.

The means for introducing and withdrawing the catalyst can then comprise a valve disposed at the inlet to the reaction zone of the first stage and a valve disposed at the outlet from the reaction zone of the last stage, these zones communicating between themselves.

In a variation of the vessel, the catalyst can be in the form of a moving bed, with substantially gravitational flow, the reaction zone or zones of one stage being connected to that/those of a lower stage via at least one passage with cross section S1 that is reduced with respect to the cross section S2 of the reaction zone, the reaction zone or zones of the first stage comprising means for introducing catalyst and the reaction zone or zones of the final stage comprising catalyst extraction means, said extraction means comprising a means for adjusting and controlling the rate of catalyst flow.

Depending on the envisaged chemical reaction or reactions, in particular their kinetic and/or thermodynamic characteristics, and depending on the desired degree of conversion and selectivity for said reaction or reactions, the scope of the invention encompasses the general motion of the feed in the vessel being either co-current with or counter-current to the catalyst.

In a further variation of the vessel, the catalyst can be in the form of a fixed bed during a major part of the time and periodically be in the form of a moving bed, over a minor part of the time. This allows a portion of the used catalyst to be renewed using fresh or regenerated catalyst.

When functioning as a moving bed, the renewing and extraction means will usually be selected to enable the catalyst to move from top to bottom in said vessel in a continuous or discontinuous manner from an upper reaction zone to a lower reaction zone under gravity.

Renewal and extraction enables the catalyst to circulate in the catalyst bed or beds either continuously or discontinuously (for example, 10% of the total volume every three days), the catalyst bed or beds then being similar to moving beds. The degree of renewal with respect to the total catalyst volume during discontinuous circulation will be optimised by the skilled person using any known technique, for example as a function of the properties of the catalyst employed and on the desired chemical reaction or reactions. Clearly, the scope of the invention encompasses renewing the catalyst by an amount of up to the whole volume contained in the catalyst bed or beds.

In a preferred moving bed embodiment, the catalyst and reaction fluids move co-currently along the axis of the vessel.

Preferably, a catalyst bed is divided into one reaction zone per stage, the cross section S2 of the catalytic bed in the reaction zones being higher than the cross section S1 for passage of said catalyst between two successive reaction stages.

In general, the reaction vessel comprises at least two catalytic beds disposed so that one reaction zone (12) alternates with a heat exchange zone (5) in the direction of motion (16) of the reaction fluids.

Preferably, the reaction vessel comprises at least two stages and at least two reaction zones per stage.

In a preferred embodiment, the vessel comprises 3 to 12 successive reaction zones, limits included, in the direction of movement of the reaction fluids, more preferably between 4 and 8 zones, limits included.

In a first embodiment, at least one of the reaction zones has a substantially planar form.

In a second embodiment, at least one of the reaction zones has a substantially annular form.

In a third embodiment, at least one of the reaction zones has a substantially elliptical cross section.

In accordance with the invention, downstream of at least one exchange zone in the direction of motion of the reaction fluids, the reaction vessel comprises at least one means encouraging mixing of the reaction fluids from this exchange zone, prior to their introduction into a reaction zone downstream of said exchange zone.

In an advantageous embodiment, a means placed substantially at the centre of at least one stage allows separation of the reaction fluids into a plurality of streams, each stream then separately traversing a succession of reaction zones and heat exchange zones within that stage.

In an alternative embodiment, the means for transporting the reaction fluids from one stage to another are disposed substantially in the proximity of the central axis of the vessel.

In general, at least one of the heat exchange zones comprises a series of finned tubes, the reaction fluids externally of said tubes.

Advantageously, a reaction vessel in accordance with the invention is used to dehydrogenate linear paraffins containing about 3 to about 20 carbon atoms.

It is also advantageous to use a reaction vessel in accordance with the invention in a process for producing aromatic compounds wherein at least one of the substituents on the aromatic ring is a linear aliphatic chain, in general alkyl, containing 3 to 20 carbon atoms, and wherein one step is the formation of mono-olefinic compounds in said vessel.

The invention also concerns a process for converting a hydrocarbon feed employing a reaction vessel comprising at least two catalytic reaction stages, characterized in that the feed is moved substantially transversely in at least one reaction zone of a first stage of the vessel at a suitable temperature, a reaction fluid is recovered at the outlet from the reaction zone, heat is exchanged between the reaction fluid and a heat exchange fluid in at least one heat exchange zone located downstream of the reaction zone and inside the vessel and after heat exchange, the reaction fluid is moved into at least one reaction zone of a subsequent stage, a conversion effluent being recovered from the final stage of the reaction vessel, the residence time of the catalyst in each reaction zone and the hourly space velocity of the feed being determined to limit the temperature variation in each reaction zone and heat exchange being controlled to adjust the temperature of the reaction fluid entering the reaction zone to a level substantially at most equal to the temperature of the reaction fluid entering the preceding zone.

The term "hourly space velocity" means the ratio of the hourly mass flow rate of the hydrocarbons to the mass of catalyst. In a variation of the process, when the reaction zone of one stage communicates with that of a subsequent stage under moving bed catalyst conditions, the flow of the feed and/or the reaction fluids crosses the flow of the catalyst.

In a further variation of the process, each reaction zone can function as a fixed bed for a major portion of the time and as a moving bed for a minor portion of the time to carry out periodic extraction of a portion of the catalyst.

The operating conditions can be as follows:
- HSV (hourly space velocity): 1 to 100 $h^{-1}$, preferably 5 to 30 $h^{-1}$;
- contact (residence) time of catalyst in each zone: 0.01 s to 1 s, preferably 0.03 to 0.1 s.

The variation in temperature in each reaction zone is limited to a value in the range 2° C. to 50° C., preferably in the range 4° C. to 15° C.

When the catalyst is used in the form of a moving bed either continuously or sequentially, it can move under gravity at a rate generally in the range 1 cm/h to 20 cm/h, preferably in the range 2 cm/h to 10 cm/h.

In a further characteristic of the process, a portion of the catalyst is extracted from the outlet from the vessel and regenerated in at least one regeneration zone located outside the vessel and re-introduced into the reaction zone inside the vessel.

The catalyst can clearly be made up with fresh catalyst.

BRIEF DESCRIPTION OF THE DRAWINGS

The invention will be better understood from the accompanying FIGS. 1 to 10, which illustrate different embodiments of the invention without, however, limiting its scope.

DETAILED DESCRIPTION OF THE DRAWINGS

Figure 1:
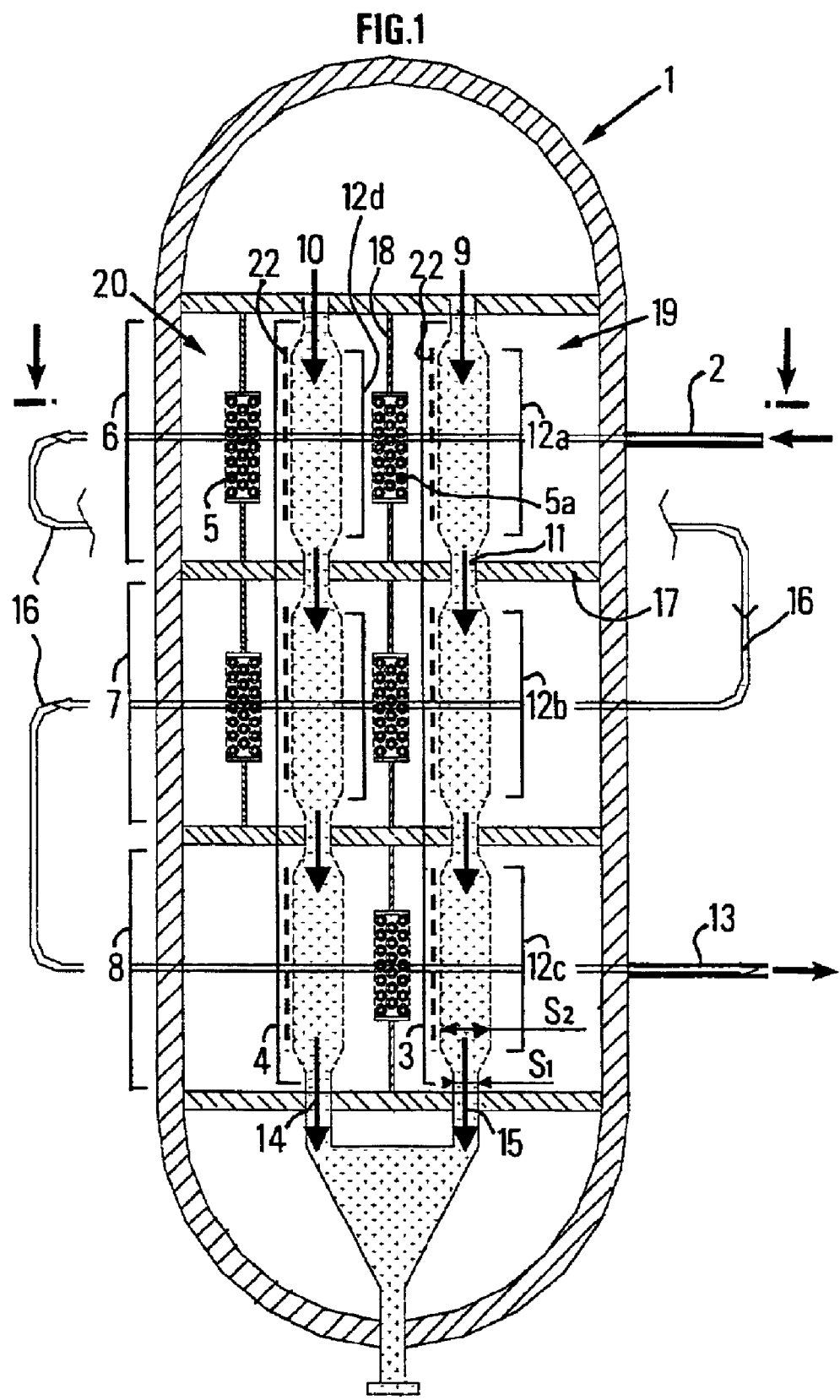
FIG. 1 shows a first embodiment of a reaction vessel of the invention showing catalytic beds that are generally planar, distributed over a plurality of stages.
Figure 2:
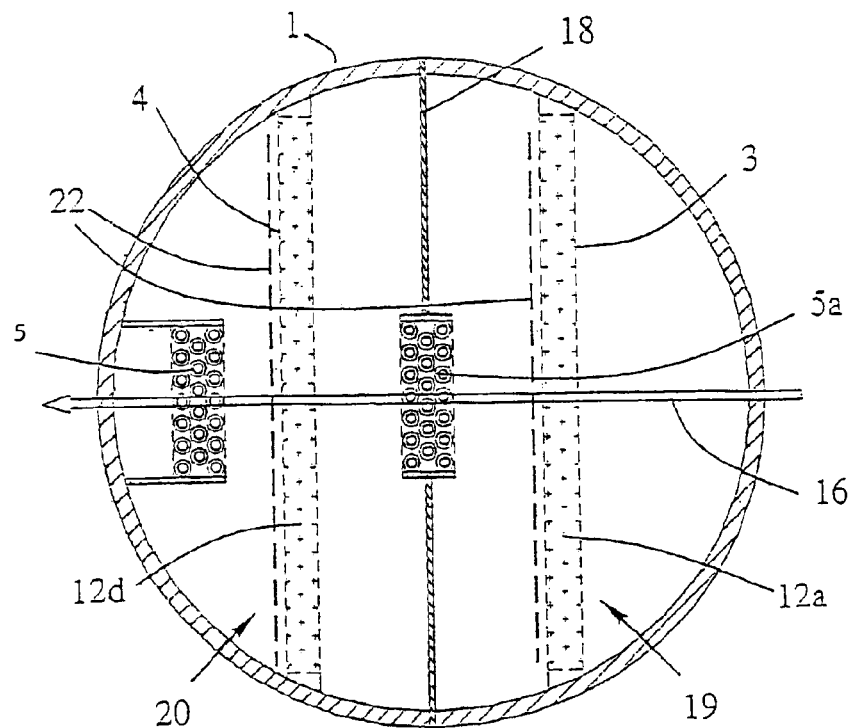
FIG. 2 is a transverse cross section through axis A–A' in FIG. 1.

The reactor shown in FIGS. 1 and 2 comprise a substantially cylindrical vessel 1 inside which are two catalytic beds 3 and 4 separated by heat exchange zones or exchangers 5. The initially gaseous feed to be treated is introduced into the top portion of reactor 1 via an introduction means 2 then substantially radially traverses a succession of reaction zones 12 and heat exchange zones 5. The fluids resulting from these successive transverses, a mixture of products and unconverted reactants, are hereinafter termed reaction fluids. In the direction of motion of the initial feed to be treated, we observe a bed 3 disposed upstream of a first exchanger 5a and a bed 4 disposed downstream of the first exchanger 5a. Beds 3 and 4 in this embodiment shown in FIGS. 1 and 2 have a substantially planar shape. The reaction vessel is divided into a plurality of stages 6, 7, 8 separated by sealed horizontal plates 17, through which the reaction fluids are routed along the circuit indicated by the succession of arrows 16. The vessel shown in FIG. 1 thus comprises six successive reaction zones 12 in the direction of motion (16) of the reaction fluids.

The initial gas feed arriving via introduction means 2 radially traverses the upper stage 6 of the vessel and the first catalytic zone 12a of the upstream bed 3 containing the freshest portion of the catalyst. The reaction fluids from this passage are homogeneously distributed over the entire outlet surface of the reaction zone 12a by the distribution means 22, for example of the perforated plate type, generating a uniform pressure drop over the whole of said surface.

The reaction fluids are then confined into a first exchange zone by plates 18 delimiting two semi-cylindrical zones 19, 20 in the vessel (FIG. 2) that are substantially equal and only communicating via a first heat exchange zone 5a in which a series of tubes is disposed to allow heat exchange between a heat carrying fluid and the reaction fluid. This heat exchange will be sufficient to raise the temperature of the reaction fluids to a value that is optimal for the production of a degree of conversion and a selectivity that is acceptable for the chemical reaction and to guarantee proper chemical behaviour of the catalyst. The reheated reaction fluids then traverse the downstream bed 4 in a second catalytic zone 12d before passing into stage 7 immediately below to re-traverse a series of reaction zones 12 and heat exchangers 5 following the same principle. The fluids are collected by a recovery means 13 at the outlet from the final stage 8. To avoid variations in the temperature of the reaction fluids, their passage from one stage to another is preferably inside vessel 1.

The foregoing means that the catalyst and reaction fluids move generally in a downward co-current motion but they are brought into contact by a cross-motion inside each reaction stage. As there is no addition of catalyst between the reaction zones, this disposition results in a gradual cokefaction of the catalyst inside the reaction vessel, the reaction fluids traversing a catalyst that is progressively more exhausted and coked during their passage. When the catalyst arrives at the bottom of the reactor, an extraction hopper ensures its evacuation outside the reaction vessel.

The fluid paths and the disposition of the stages shown in FIG. 1 are only given by way of illustration, of course, and do not in any way limit other possibilities of routing and distribution of the fluids in one stage or between stages in the reaction vessel. Each catalytic bed 3, 4 is supplied from its upper end 9, 10 via a means for introducing a solid catalyst (not shown). As an example, charging and/or supply can be made via the same catalyst supply hopper that uniformly distributes the catalyst between the two beds. The catalyst flows from top to bottom very slowly along each of these beds under the effect of gravity to pass from an upper stage to a lower stage. The rate of gravitational flow of the catalyst is controlled by a calibrated orifice that is not shown in the Figure, disposed at the outlet from the reaction zone 12c of the last stage.

The used catalyst is finally withdrawn from the lower portion of vessel 1 via extraction means 14, 15 connected to an extraction hopper, extraction possibly being carried out either continuously or sequentially. Looking at upstream bed 3 in more detail, between two successive stages (6–7 or 7–8) of the vessel, at the level of the transfer means or diplegs 11, it has a restricted communication cross section (S1) that is smaller than the cross section (S2) of the reaction zones (12a, 12b, 12c). The downstream bed has the same disposition. The presence of transfer means 1 with a restricted cross section allows effective mixing of the catalyst grains from the upper stage and homogeneous redistribution of those grains to the lower stage. In this manner, the temperature and degree of cokefaction of the catalyst at the head of each reaction zone is highly uniform regardless of the stage considered. Such an arrangement has the advantage of increasing the selectivity of the reaction and better management and use of the catalyst. The shape, length and number of the transfer means will be optimised by the skilled person so that the flow from one zone to another is as close as possible to piston flow, i.e., to limit the spaces in which the flow of grains is slower and where cokefaction is accentuated. These transfer means can, for example, take the form of tubes that are judiciously distributed between an upper planar reaction zone and a lower planar reaction zone.

Similarly, the thickness of the catalytic beds will be determined using any technique that is known to the skilled person to maintain the temperature in the reaction bed at an acceptable level, the variation in temperature between the inlet and outlet of the bed being as small as possible.

The catalyst grains are maintained inside the moving bed by screens of known type allowing the reaction fluids to traverse the reaction zones substantially radially.

The heat carrying fluids used in exchangers 5 are, for example, pressurised steam, with a pressure that is varied depending on the heat transfer required for the chemical reaction to be carried out properly, between 0.5 MPa and 10 MPa absolute, limits included, or even between 2 and 5 MPa absolute, or a hot gas present on the production site. The heat exchanger can be an exchanger constituted by finned tubes, the reaction fluids traversing the exchange from the fin side. Selecting finned tubes has the major advantage of substantially reducing the wall temperature and thus the risk of cokefaction on those tube walls. The scope of the invention also encompasses any known type of exchange surface. Depending on the level of temperature control envisaged in the vessel and/or the operating conditions imposed by the desired chemical reaction, it is possible to envisage supplying each exchanger with carrying fluid or communal supply of a heat carrying fluid to a plurality of exchangers mounted in series.

A portion of the reaction fluids can pass from one reaction zone to that below via catalytic bed transfer means 11. This quantity, however, remains a minimum in the case of co-current movement of the fluid-catalyst ensemble because of the overall pressure balance in the vessel. Further, the smaller value of the cross section S1 of transfer means 11 encourages movement of gas from one reaction zone to the next via the heat exchanger, rather than passing directly via said means. If, however, too large a portion of the fluids passes directly through the transfer means, a small quantity of inert gas could be injected into the bottom portion of each reaction zone to produce a barrier to said fluids. At the outlet from each exchanger, a device for creating a pressure drop can be positioned to prevent any preferential passage of gas across the exchanger.

Figure 3:
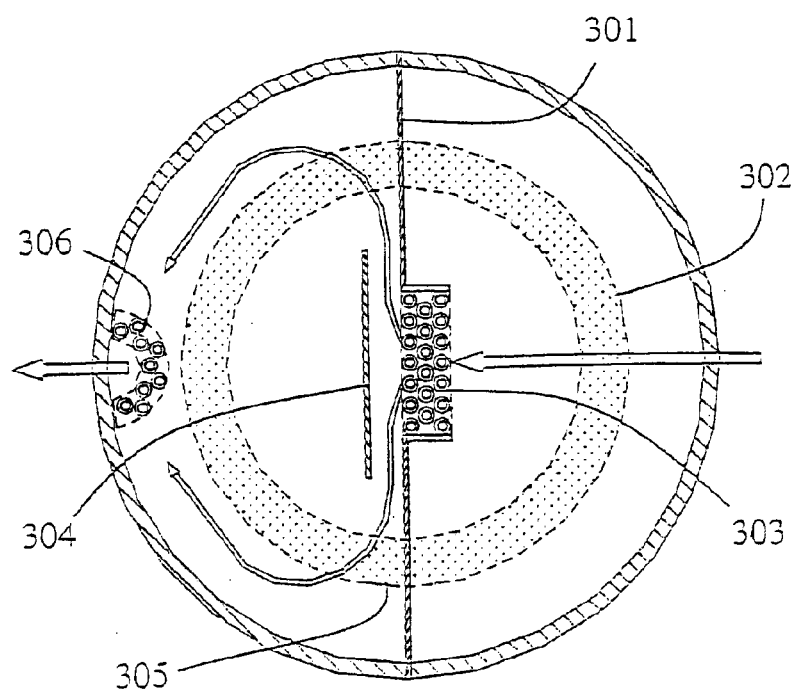
FIG. 3 shows a second embodiment of a reaction vessel in which the shape of the catalytic beds is substantially annular.

FIG. 3 shows a different disposition of the catalytic beds in the reaction vessel. The cross section of said catalytic bed is generally annular, and physically separated by a mechanical means 301 isolating the bed as a whole into two sealed semi-cylindrical sectors. The feed traverses the first sector or the first bed 302 then passes through an exchanger 303, then the reaction fluids from 302 are re-distributed to ensure good temperature homogeneity via a means 304 encouraging turbulent mixing, then traverse a second sector or a second bed 305. The gas is then collected on one side of the reactor, passing via an exchanger 306 to raise it to the desired temperature before its introduction into the lower stage, and functioning, for example, on a principle that is identical to that of the stage described.

Figure 4:
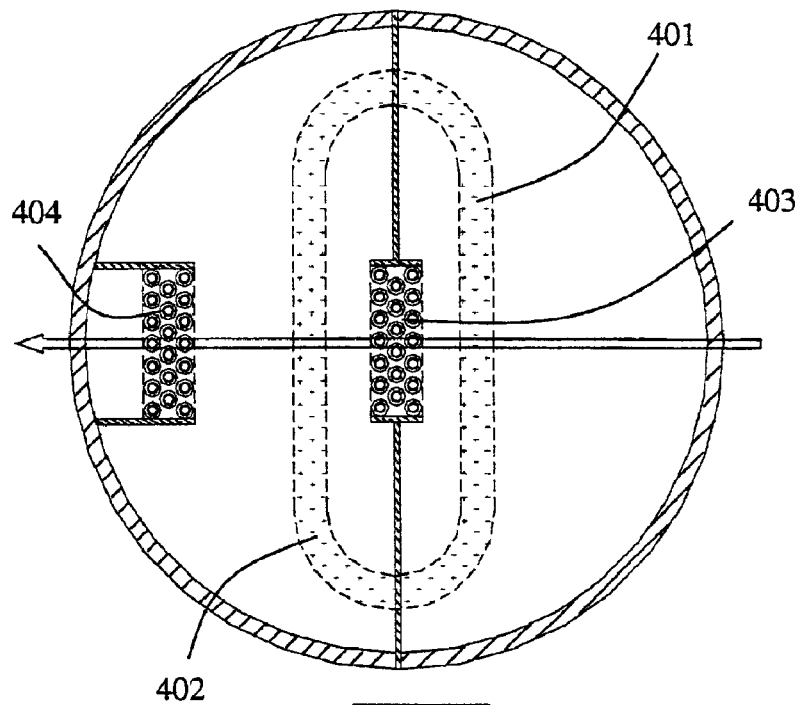
FIG. 4 shows a third embodiment of the vessel, similar to that of FIG. 3, but for which the catalytic beds are substantially elliptical in shape.

FIG. 4 shows a reactor stage that is identical to that of FIG. 3 but composed of two annular beds 401, 402 with a substantially semi-elliptical shape, and the advantage of which is to allow a gain in space in the reaction vessel itself to better facilitate inspection and subsequent cleaning of exchangers 403, 404.

Figure 5:
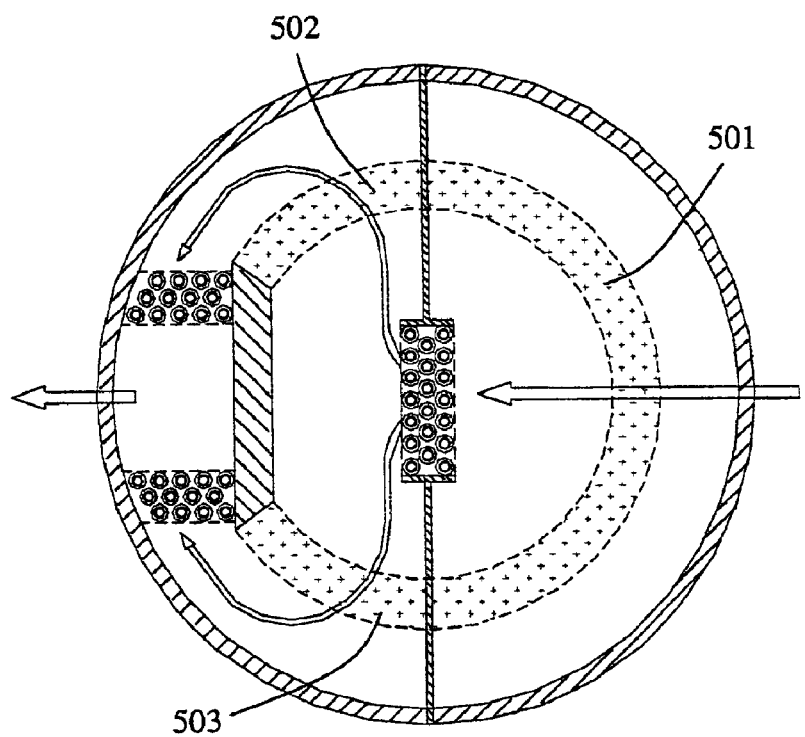
FIG. 5 shows a fourth embodiment of the invention with a succession of catalytic beds of different sizes.

FIG. 5 shows a further embodiment of a stage of the reaction vessel, substantially identical to that described with respect to FIG. 3 but composed of three annular beds 501, 502, 503. The first bed is identical to that of FIG. 3; the next two have different sizes. This disposition has the advantage of varying the quantity of catalyst depending on the beds.

Figure 6:
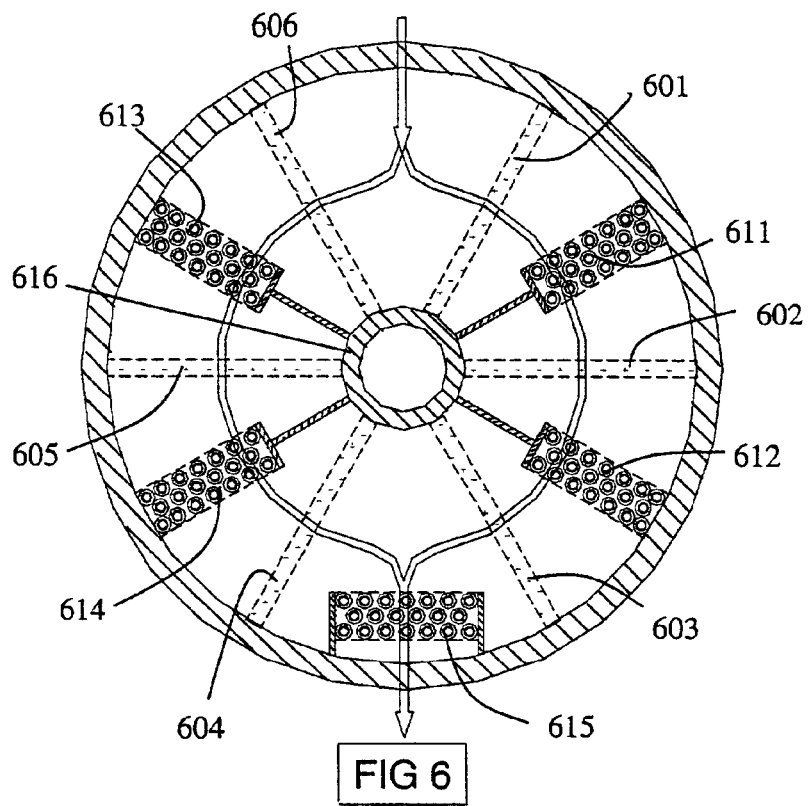
FIG. 6 shows a further embodiment in which the catalytic beds inside the reaction vessel are distributed in the shape of a star.

FIG. 6 shows an embodiment of a stage in the reaction vessel in which six planar catalytic beds (601 to 606) are disposed in a star shape. An exchanger (611 to 614) is disposed between each bed. Thus, the reaction fluids traverse three catalytic beds in series at each stage. Thus, counting the exchanger placed at the outlet, there are five exchangers in each stage (611 to 614 and 615), the last one being communal for the final two catalytic beds. A central means 616 allows distribution of the reaction fluids through the succession of reaction zones and heat exchangers.

Figure 7:
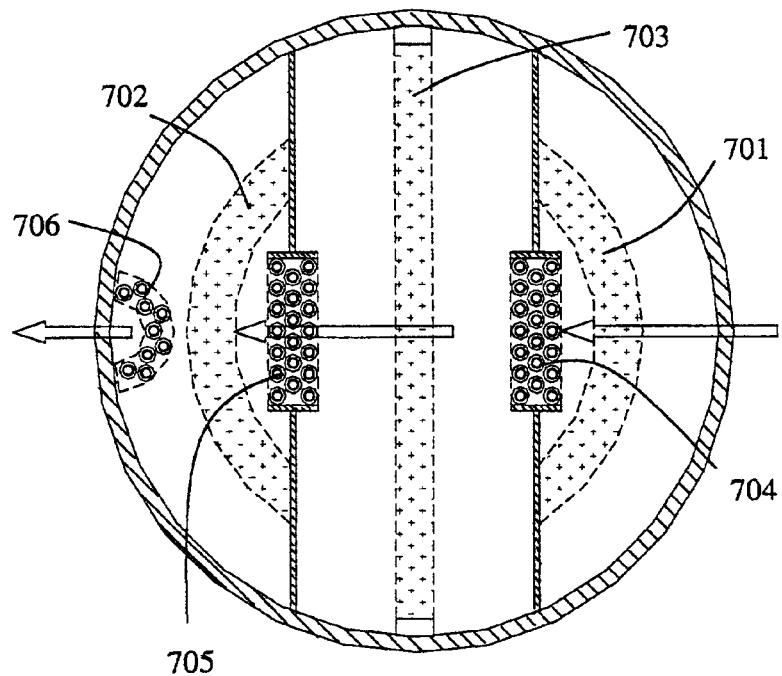
FIG. 7 shows a sixth embodiment in which the successive beds are of different shapes.

FIG. 7 has a reactor stage in which three catalytic beds, two with an annular cross section 701, 702 and one planar, 703, are disposed in series. An exchanger 704, 705 is disposed between each bed. The reaction fluids traverse three catalytic beds in series (701, 702, 703) in the stage. Finally, three exchangers (704, 705, 706) are disposed in each stage.

Figure 8:
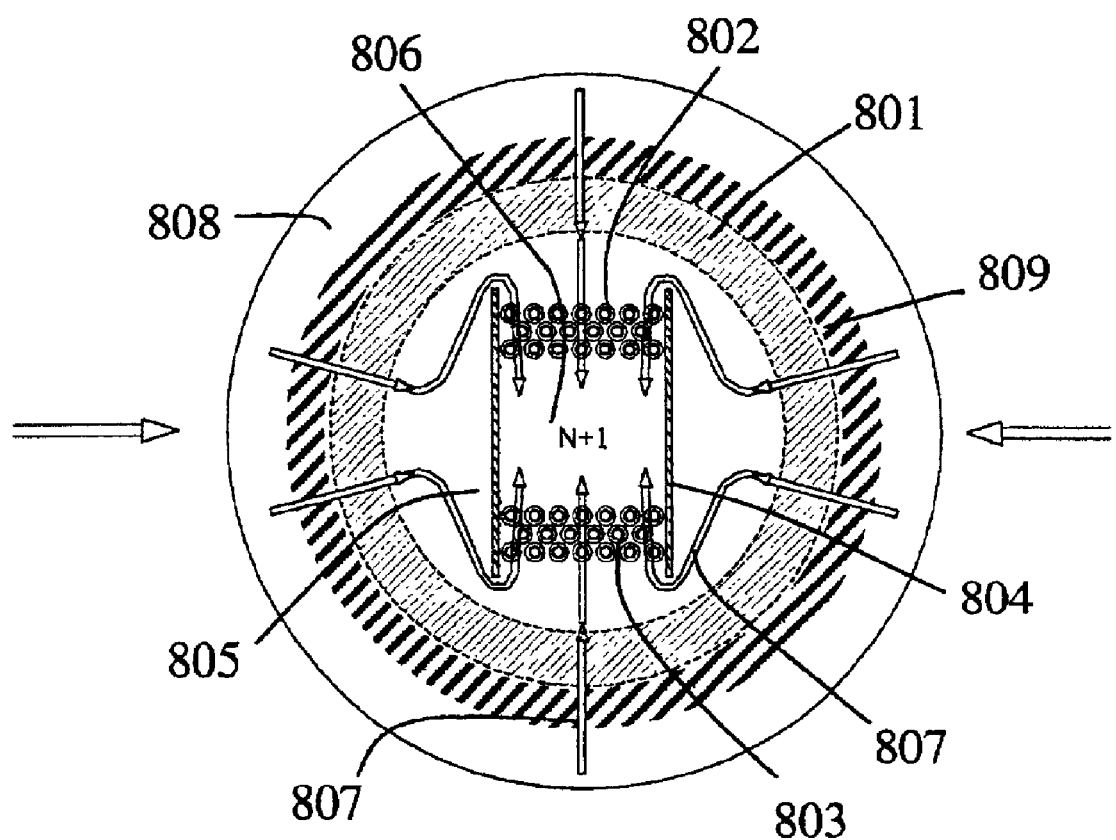
FIG. 8 shows a seventh embodiment of the invention (top view) in which transport and passage of the reaction fluids from one stage to another is carried out close to the central axis of the vessel.

FIG. 8 shows an embodiment of stage N of a substantially circular reaction vessel in which a cylindrical catalytic bed 801 is disposed. The reaction fluids, originating from the peripheral portion 808 of the stage, traverse the bed radially then circulate through heat exchange zones (802, 803) located either side of a central collector 806. Arrows 807 show examples of different possible paths for said fluids. Guiding and mixing devices for the reaction fluids (804, 805) are disposed to oblige said fluids to traverse the exchange zones (802, 803). The reheated reaction fluids then progress towards stage N+1, for example, which has an identical disposition to that of stage N. A plate 809 disposed between stages N and N+1 can re-distribute the reaction fluids into the peripheral portion of stage N+1. Although not shown in FIG. 8, it is clear that known means will prevent direct passage between the successive peripheral portions 808 of stages N and N+1.

In the example shown in FIG. 8, each stage comprises a reaction zone and an exchanger. However, the scope of the invention encompasses disposing a plurality of successive circular catalytic beds upstream of the central collector in the direction of motion of the reaction fluids, between which the heat exchange zones are inserted.

Figure 9:
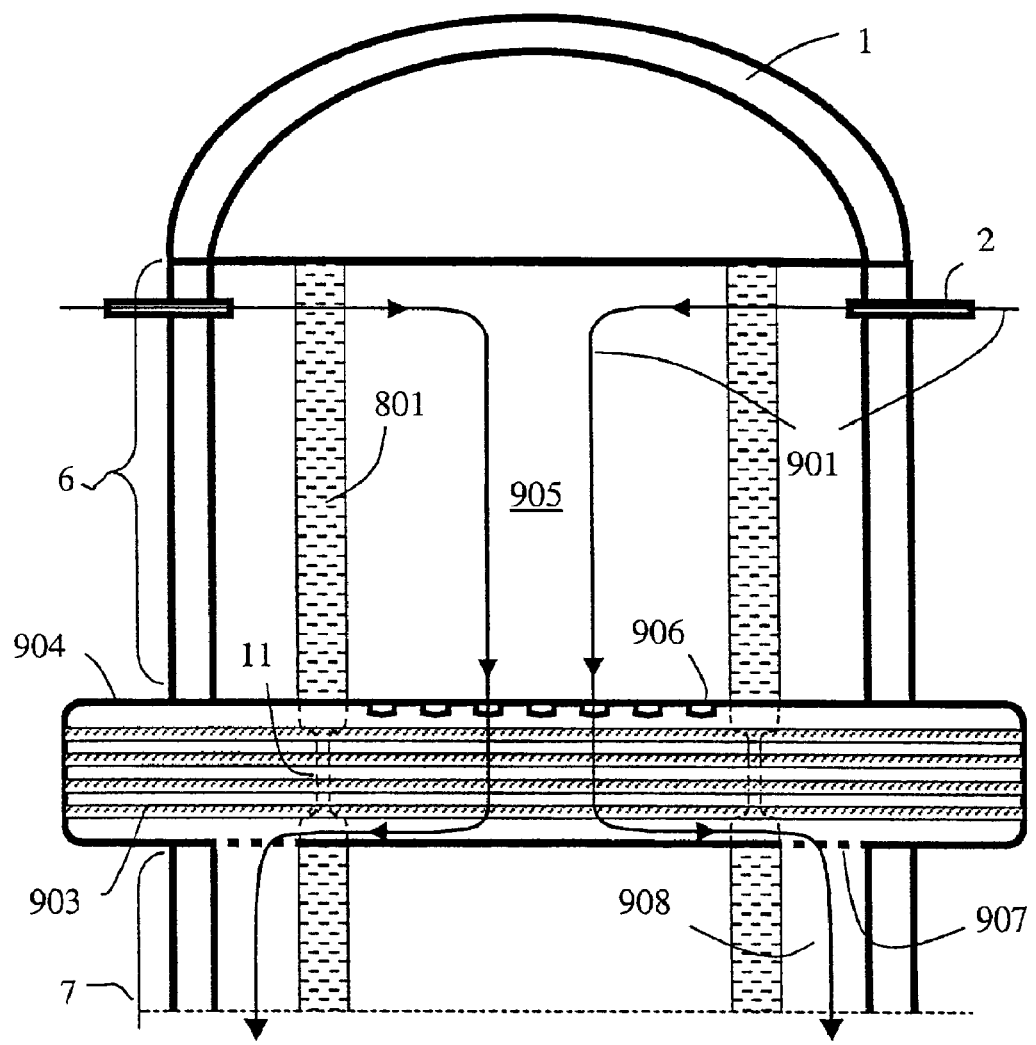
FIG. 9 shows a further embodiment of the invention in which an annular bed is present inside each stage and in which the means for exchanging heat between the reaction fluids and the heat carrying fluids are disposed between the stages.

FIG. 9 shows a further particularly advantageous embodiment of the present invention. In this embodiment, each stage has a substantially annular catalytic bed analogous to that of FIG. 8. Reactor 1, shown in cross section through its longest length in FIG. 9, has a succession of stages each with an identical disposition and so only the first two, 6 and 7, are shown. In this embodiment, in contrast to the foregoing embodiments, the heat exchange means are disposed between the successive stages of reactor 1. Said heat exchange means are in the form of tubes 903 in which the heat carrying fluid moves. Tubes 903 are arranged and disposed in accordance with any technique that is known to the skilled person inside a vessel 904 in which the reaction fluids move. Vessel 904 containing tube exchangers 903 has at least one orifice or a slot 906 in its upper semi-cylindrical portion and at the portion opening into space 905 delimited by the internal surface of the cylindrical bed 801. In general, the skilled person will seek to increase the number of these orifices 906 to optimise contact and thus to maximise the effective surface area for heat exchange between the reaction fluids and the exchanger tubes 903 in vessel 904. In its lower semi-cylindrical portion, vessel 904 is perforated with slots 907 to allow the passage of reaction fluids that have exchanged heat to the lower stage 7. Slots 907 are produced to allow re-distribution of said fluids into the peripheral portion 908 of stage 7, i.e. along the external surface of the cylindrical catalytic bed 801. In the embodiment of FIG. 9, transfer legs 11 disposed around cylinder 904 and analogous to those described in relation to FIG. 1 ensure the movement of the catalyst inside bed 801.

During operation of reactor 1, the routes of the reaction fluids are shown by arrows 901. The reactants are introduced via means 2 then traverse bed 801 towards internal space 905. The fluids from the catalytic beds pass into vessel 904 and exchange heat with tubes 903 before passing via slots 907 into the peripheral annular portion 908 of lower stage 7. The disposition of stage 7 is analogous to that of stage 6 and the same succession of steps is carried out.

The embodiment of the invention illustrated in FIG. 9 has two advantages:

firstly, as shown by the path 901, it allows crossed contact of streams of reaction fluids and heat carrying fluids, such a disposition generally being considered to encourage heat exchange;

secondly, vessels 904 containing tubes 903 can be readily extracted from the reactor, for example for cleaning.

Figure 10:
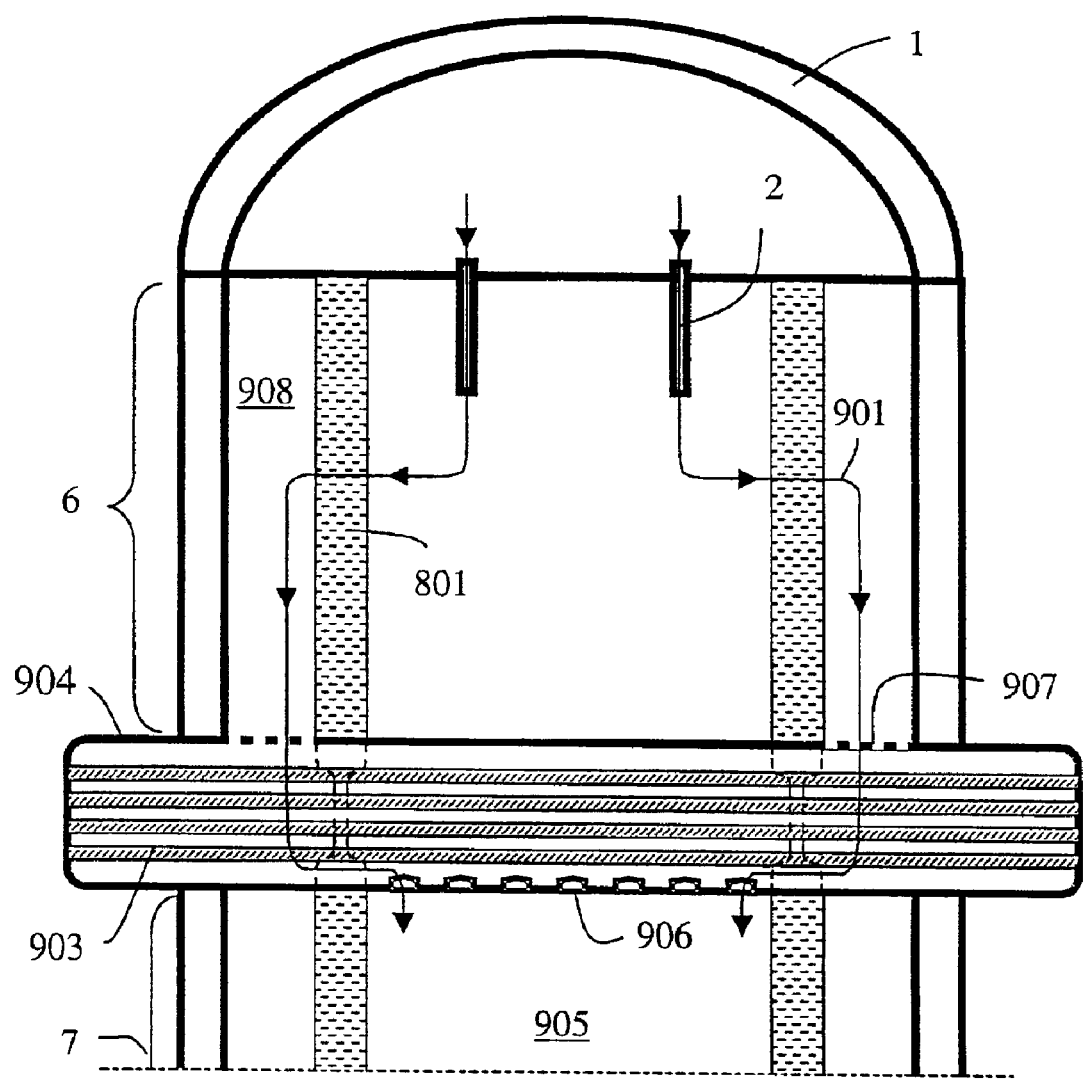
FIG. 10 shows an alternative disposition to that shown in FIG. 9.

FIG. 10 shows an embodiment of the invention that is similar to that described above in relation to FIG. 9. The same elements are shown in an identical manner and their numbering is preserved in the two figures. The structural differences between the two modes are:

the position of means 2, which allow the reactants to be introduced into space 905;

the position of element 904.

In the embodiment shown in FIG. 10, the semi-spherical portion perforated with slots 907 of vessel 904 is placed so that said slots communicate with the external annular space 908 of upper stage 6 and orifices 906 allow the reaction fluids to pass inside vessel 904 towards space 905 of lower stage 7.

These structural differences mean that the movement of the reaction fluids shown by the arrowed path 901 in each stage of the reactor 1 is in a direction contrary to that of the preceding embodiment (FIG. 9). The embodiment shown in FIG. 10 has the advantage of encouraging mixing and improving the homogeneity of the temperature of the reaction fluids at the outlet from element 904.

The scope of the invention also includes constituting the reaction vessel with a plurality of identical stages or stages with a different disposition. The total number of stages and the number of reaction zones and exchange zones per stage will be determined using any technique that is known to optimise the degree of conversion and the selectivity of the chemical reaction towards the final desired product.

The various figures illustrate the case where the catalyst and feed for reaction move in a crossed manner, the catalyst moving in a moving bed and under gravity, the downward speed of the catalyst being controlled or even imposed by a calibrated orifice at the outlet from the reaction zone of the final stage of the vessel, providing a rate that is generally in the range 1 cm/h to 20 cm/h.

In an advantageous variation of the apparatus, not shown in FIG. 1, but which can be related to this FIG. 1, each reaction zone can be constituted by a fixed catalyst bed.

In the apparatus that can function in fixed bed mode, a supply valve is located upstream of the hopper for supplying catalyst to the reaction zone or zones of the first stage and an extraction valve is located downstream of the hopper for extracting catalyst from the reaction zone or zones of the final stage.

The hydrocarbon feed moves transversely through a first reaction zone of the first stage; the resulting reaction fluid traverses a first heat exchanger of the first stage, then moves transversely into a second reaction zone of the first stage and finally heat is exchanged in a second exchanger of the same stage.

The reaction fluid leaving the first stage is introduced into a second stage where it moves transversely in a first reaction zone of the second stage, traverses a first heat exchanger of the second stage, moves transversely in a second reaction zone of the second stage and finally exchanges heat in a second exchanger of the same stage. The sequence of steps is repeated in the third stage and so on, until a final conversion effluent is produced.

The apparatus can function in fixed bed mode for a long period of time, for example two or three days, then it can function in moving bed mode by periodic controlled opening of the extraction valve, for example for a period of time not exceeding one hour.

The non-limiting example given below illustrates the preferred configuration shown in FIG. 8:

The feed is introduced via an annular distributor with a diameter of 2000 mm and thickness of 200 mm.

It substantially radially traverses the annular catalytic bed with a diameter of 1600 mm, thickness 50 mm and depth 2000 mm.

The diameter of the central collector is 1500 mm and the thickness is 100 mm. The exchanger placed in the centre occupies a square space with 800 mm sides. This exchanger is composed of 212×19.05 mm diameter tubes, type BWG 16 with an internal diameter of 15.75 mm. These tubes are disposed in a square lattice with a pitch of 25.3 mm. If necessary, they can be provided with fins to produce the required exchange surface.

In the cited example, a feed with the following characteristics was dehydrogenated:

feed flow rate: 55689 kg/h;

molecular weight of feed: 25.7 kg/kmole;

inlet temperature: more than 450° C.;

inlet pressure: 2 bars absolute (1 bar=$10^{-1}$ MPa).

The catalyst was divided into 5 stages each of 0.44 m³ in the form of a fixed bed, each stage being connected to the next by 2000 mm long diplegs. Between each stage, there was a tube exchanger in the central portion and the reheating fluid moving in the tubes was steam at 40 bars.

The table below shows the power in each of the 4 exchangers, the exchange surface and the steam flow rate:

| | | |
|---|---|---|
| exchanger 1: 810 kW | 68.3 m² | 0.62 m³/s |
| exchanger 2: 570 kW | 50.5 m² | 0.44 m³/s |

-continued

| | | |
|---|---|---|
| exchanger 3: 450 kW | 41.1 m² | 0.35 m³/s |
| exchanger 4: 240 kW | 22.2 m² | 0.18 m³/s |

The steam was distributed in the exchanger by a toroidal collector with an external diameter of 1200 mm.

For each of the exchangers the temperature difference between the inlet and outlet on the steam side was 60° C.

The inlet temperature of the feed at each stage was substantially the same.

The temperature conditions for the feed at each stage are shown in the table below, in the form of the temperature difference between the inlet and outlet for each stage:

first stage: deltaT inlet/outlet: 13.5° C.;

second stage: deltaT inlet/outlet: 9.5° C.;

third stage: deltaT inlet/outlet: 7.5° C.;

fourth stage: deltaT inlet/outlet: 4° C.

This example clearly shows that the low thickness of catalyst in each reaction zone traversed by the hydrocarbons and in particular the low ratio of thickness to height of the reaction zone (50/2000 in the present case) combined with the presence of the exchanger located in the present case in the central portion of the vessel produces quasi isothermicity of the reaction zones. This example also shows that it is possible to place the exchanger necessary to maintain quasi isothermicity of the reactive effluents in the central portion of the vessel.

What is claimed is:

1. A reaction vessel that is elongated substantially along a substantially vertical axis, comprising at least two stages in the vertical direction, in which at least one endothermic or exothermic catalytic reaction is carried out, comprising:

at least one catalytic reaction zone (12a, 12b) per stage (6, 7) and extending substantially along the axis of the vessel;

means (2) for introducing at least one reaction fluid to a stage adapted for substantially transverse fluid movement over substantially the whole vertical extent of the reaction zone;

means for introducing catalyst into the at least one reaction zone and means for extracting catalyst from the at least one reaction zone;

at least one means (5a) for heat exchange with reaction fluids, located inside the vessel between two successive reaction zones;

means (6) for transporting reaction fluids from one stage to a subsequent stage connected firstly to a heat exchange means of the one stage and secondly to the reaction zone of the subsequent stage; and means for recovering reaction fluids downstream of the last stage;

wherein the thickness of each reaction zone being determined to limit the variation in temperature in said zone and the heat exchange means being adapted to adjust the temperature of the reaction fluids entering the reaction zone to a level substantially at most equal to that of the temperature of the reaction fluids entering the preceding zone, and in which the catalyst is in the form of a moving bed, with substantially gravitational flow, the at least one reaction zone of one stage being connected to that/those of a lower stage via at least one passage with cross section (S1) that is reduced with respect to the cross section (S2) of the at least one reaction zone, the at least one reaction zone of the first stage comprising means for introducing catalyst and the at least one reaction zone of the final stage comprising catalyst extraction means, said extraction means comprising a means for adjusting and controlling the rate of catalyst flow.

2. A reaction vessel according to claim 1, comprising means for moving the catalyst and reaction fluids in a generally co-current motion along the axis of the vessel.

3. A reaction vessel according to claim 2, comprising at least two stages (6, 7) and at least two reaction zones (12a, 12d) per stage.

4. A reaction vessel according to claim 2, comprising three to twelve reaction zones, limits included.

5. A reaction vessel according to claim 2, comprising downstream of the heat exchange means in the direction of motion of the reaction fluids, at least one means (304, 804, 805) for mixing of the reaction fluids from the heat exchange means prior to their introduction into the reaction zone located downstream of said heat exchange means.

6. A reaction vessel according to claim 2, wherein the means for transporting reaction fluids from one stage to the lower stage are disposed substantially in the proximity of the central axis of the vessel.

7. A reaction vessel according to claim 2, wherein at least one of the heat exchange means comprises a series of finned tubes, the reaction fluids moving externally of said tubes.

8. A reaction vessel according to claim 2, wherein at least a portion of said heat exchange means is disposed between two successive stages.

9. A reaction vessel according to claim 1, comprising at least two stages (6, 7) and at least two reaction zones (12a, 12d) per stage.

10. A reaction vessel according to claim 9, comprising three to twelve reaction zones, limits included.

11. A reaction vessel according to claim 9, comprising downstream of the heat exchange means in the direction of motion of the reaction fluids, at least one means (304, 804, 805) for mixing of the reaction fluids from the heat exchange means prior to their introduction into the reaction zone located downstream of said heat exchange means.

12. A reaction vessel according to claim 1, comprising three to twelve reaction zones, limits included.

13. A reaction vessel according to claim 1, wherein at least one of the reaction zones has a substantially planar cross section.

14. A reaction vessel according to claim 13, comprising at least two stages (6, 7) and at least two reaction zones (12a, 12d) per stage.

15. A reaction vessel according to claim 13, comprising three to twelve reaction zones, limits included.

16. A reaction vessel according to claim 15, comprising downstream of the heat exchange means in the direction of motion of the reaction fluids, at least one means (304, 804, 805) for mixing of the reaction fluids from the heat exchange means prior to their introduction into the reaction zone located downstream of said heat exchange means.

17. A reaction vessel according to claim 13, wherein at least a portion of said heat exchange means is disposed between two successive stages.

18. A reaction vessel according to claim 1, wherein at least one of the reaction zones has a substantially annular cross section.

19. A reaction vessel according to claim 1, wherein at least one of the reaction zones has a substantially elliptical cross section.

20. A reaction vessel according to claim 1, comprising downstream of the heat exchange means in the direction of motion of the reaction fluids, at least one means (304, 804, 805) for mixing of the reaction fluids from the heat exchange means prior to their introduction into the reaction zone located downstream of said heat exchange means.

21. A reaction vessel according to claim 20, comprising at least two stages (6, 7) and at least two reaction zones (12a, 12d) per stage.

22. A reaction vessel according to claim 21, comprising three to twelve reaction zones, limits included.

23. A reaction vessel according to claim 20, wherein at least one of the heat exchange means comprises a series of finned tubes, the reaction fluids moving externally of said tubes.

24. A reaction vessel according to claim 20, wherein at least a portion of said heat exchange means is disposed between two successive stages.

25. A reaction vessel according to claim 1, wherein the means for transporting reaction fluids from one stage to the lower stage are disposed substantially in the proximity of the central axis of the vessel.

26. A reaction vessel according to claim 25, wherein at least one of the heat exchange means comprises a series of finned tubes, the reaction fluids moving externally of said tubes.

27. A reaction vessel according to claim 25, wherein at least a portion of said heat exchange means is disposed between two successive stages.

28. A reaction vessel according to claim 1, further comprising a means (616) placed substantially at the centre of at least one stage for separating the reaction fluids into a plurality of streams, each stream then separately traversing a succession of reaction zones (606, 605, 604; 601, 602, 603) and heat exchange means (613, 614, 615; 611, 612, 615) within that stage.

29. A reaction vessel according to claim 28, wherein at least one of the heat exchange means comprises a series of finned tubes, the reaction fluids moving externally of said tubes.

30. A reaction vessel according to claim 28, wherein at least a portion of said heat exchange means is disposed between two successive stages.

31. A reaction vessel according to claim 1, wherein at least one of the heat exchange means comprises a series of finned tubes, the reaction fluids moving externally of said tubes.

32. A reaction vessel according to claim 31, wherein at least a portion of said heat exchange means is disposed between two successive stages.

33. A reaction vessel according to claim 1, wherein at least a portion of said heat exchange means is disposed between two successive stages.

34. A reaction vessel according to claim 1, containing at least one of linear paraffins containing 3 to 30 carbon atoms and monolefinic reaction products thereof.

35. A reaction vessel that is elongated substantially along a substantially vertical axis, comprising at least two stages in the vertical direction, in which at least one endothermic or exothermic catalytic reaction is carried out, comprising:
   at least one catalytic reaction zone (12a, 12b) per stage (6, 7) and extending substantially along the axis of the vessel;
   means (2) for introducing at least one reaction fluid to a stage adapted for substantially transverse fluid movement over substantially the whole vertical extent of the reaction zone;
   means for introducing catalyst into the at least one reaction zone and means for extracting catalyst from the at least one reaction zone;

at least one means (5*a*) for heat exchange with reaction fluids, located inside the vessel between two successive reaction zones;

means (6) for transporting reaction fluids from one stage to a subsequent stage connected firstly to a heat exchange means of the one stage and secondly to the reaction zone of the subsequent stage; and means for recovering reaction fluids downstream of the last stage;

wherein the thickness of each reaction zone being determined to limit the variation in temperature in said zone and the heat exchange means being adapted to adjust the temperature of the reaction fluids entering the reaction zone to a level substantially at most equal to that of the temperature of the reaction fluids entering the preceding zone, and in which the catalyst is in the form of a moving bed, with substantially gravitational flow, the at least one reaction zone of one stage being connected to that/those of a lower stage via at least one passage with cross section (S1) that is reduced with respect to the cross section (S2) of the at least one reaction zone.

36. A reaction vessel that is elongated substantially along a substantially vertical axis, comprising at least two stages in the vertical direction, in which at least one endothermic or exothermic catalytic reaction is carried out, comprising:

at least one catalytic reaction zone (12*a*, 12*b*) per stage (6, 7) and extending substantially along the axis of the vessel;

means (2) for introducing at least one reaction fluid to a stage adapted for substantially transverse fluid movement over substantially the whole vertical extent of the reaction zone;

means for introducing catalyst into the at least one reaction zone and means for extracting catalyst from the at least one reaction zone;

at least one means (5*a*) for heat exchange with reaction fluids, located inside the vessel between two successive reaction zones;

means (6) for transporting reaction fluids from one stage to a subsequent stage connected firstly to a heat exchange means of the one stage and secondly to the reaction zone of the subsequent stage; and means for recovering reaction fluids downstream of the last stage;

wherein the catalyst is in the form of a moving bed, with substantially gravitational flow, the at least one reaction zone of one stage being connected to that/those of a lower stage via at least one passage with cross section (S1) that is reduced with respect to the cross section (S2) of the at least one reaction zone.

* * * * *